United States Patent [19]

Schafhaupt

[11] Patent Number: 4,958,700

[45] Date of Patent: Sep. 25, 1990

[54] PROTECTIVE FACILITY FOR SUPPRESSING NOISE PRODUCED AT HIGH GAS FLOWS BY ENGINES INSTALLED ON AIRCRAFT

[75] Inventor: Horst Schafhaupt, Egenhofen, Fed. Rep. of Germany

[73] Assignee: Rheinhold & Mahla GmbH, Fed. Rep. of Germany

[21] Appl. No.: 331,529

[22] PCT Filed: Jul. 1, 1988

[86] PCT No.: PCT/DE88/00409

§ 371 Date: Apr. 17, 1989

§ 102(e) Date: Apr. 17, 1989

[87] PCT Pub. No.: WO89/00130

PCT Pub. Date: Jan. 12, 1989

[30] Foreign Application Priority Data

Jul. 3, 1987 [DE] Fed. Rep. of Germany ....... 3722112

[51] Int. Cl.⁵ .............................................. B64F 1/26
[52] U.S. Cl. ................................... 181/218; 181/287; 244/1 N
[58] Field of Search ............... 181/210, 217, 218, 284, 181/287; 244/1 N

[56] References Cited

U.S. PATENT DOCUMENTS

| | | | |
|---|---|---|---|
| 3,096,847 | 7/1963 | Hardy | 181/210 |
| 3,141,639 | 7/1964 | Klein | 181/210 X |
| 3,604,530 | 9/1971 | Duthion et al. | 181/210 |
| 3,842,941 | 10/1974 | Gerber | 181/218 |

FOREIGN PATENT DOCUMENTS

| | | |
|---|---|---|
| 2619486 | 11/1977 | Fed. Rep. of Germany . |
| 3023707 | 3/1987 | Fed. Rep. of Germany . |
| 1089630 | 11/1967 | United Kingdom . |

Primary Examiner—Benjamin R. Fuller
Attorney, Agent, or Firm—Eckert, Seamans, Cherin & Mellot

[57] ABSTRACT

A protective facility for suppressing jet aircraft noise which has a primarily horseshoe shape for surrounding a jet aircraft. Within the horseshoe and situated to the rear of any plane within the facility is found a metal, mesh lattice which redirects exhaust gasses from the jet aircraft engines upwards. Noise from the engines, in the form of sound waves, passes through the lattice and impinges upon the facility walls; being absorbed by these walls which are covered with a sound absorbing material. At the entrance to the facility are leaves hinged to the top legs of the horseshoe which roll on curved rails. These leaves may thus be swung inwards to substantially completely enclose a plane which has been placed within the horseshoe shaped facility. The leaves are also covered with sound absorbing material to absorb and deaden noises produced at the jet engine intakes. The facility walls, including the gates, are substantially rectangular in cross-section.

3 Claims, 1 Drawing Sheet

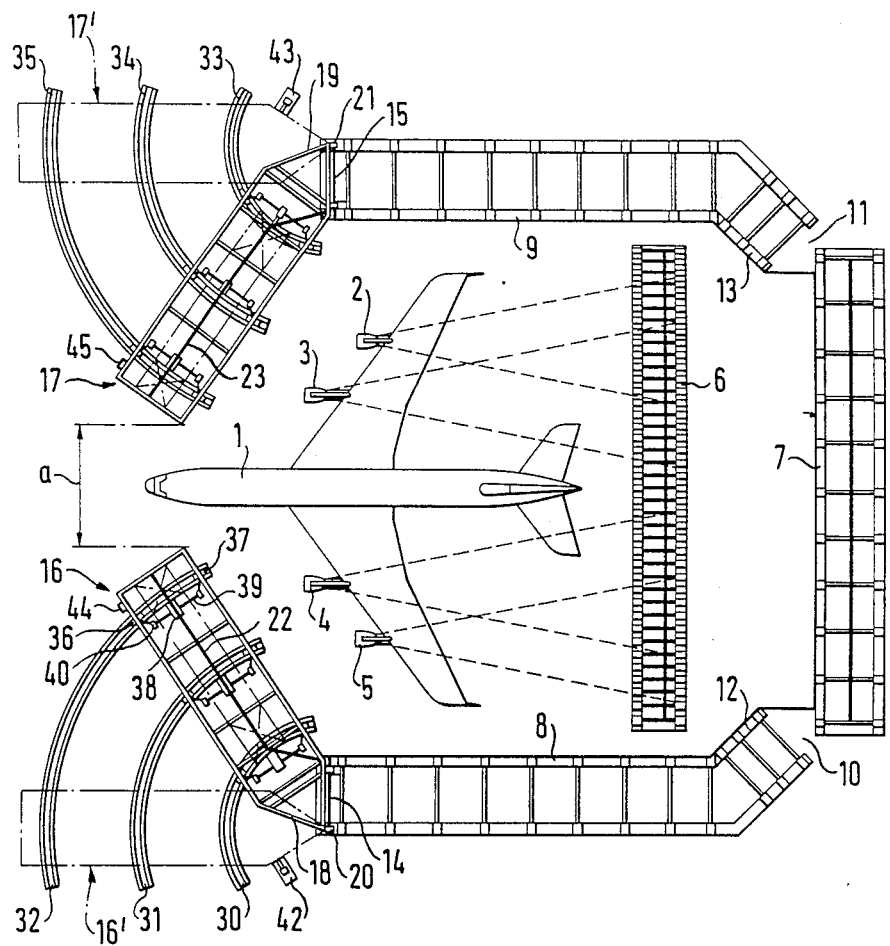

PROTECTIVE FACILITY FOR SUPPRESSING NOISE PRODUCED AT HIGH GAS FLOWS BY ENGINES INSTALLED ON AIRCRAFT

The invention pertains to a protective facility for suppressing the noise of large, high-speed gas flows, especially for aircraft engines, in which there is erected behind the engines an obliquely inclined, latticed directing element, behind which is located an approximately horseshoe-shaped sound absorption wall approximately twice the height of the directing element.

A protective facility of this type is known from DE-PS 3023707. In this instance, the gas flows which emerge at high noise intensities from aircraft engines during a test operation are deflected upward by a latticed directing element with no risk of backflow into the engine, while the noise is directed, more or less unabated, through the directing element until it is absorbed by the sound absorption wall.

This noise absorption wall is horseshoe-shaped, so that sound emerging to the sides and the rear can be sufficiently absorbed.

It is not possible, however, with a sound absorption wall configuration of this type, to also reduce noise radiated from the intake region of the engine or to reduce interfering wind loads, which in some circumstances can even prevent an engine test.

The object of the invention is therefore to configure the known sound protection facility such that sound radiation in all directions can thereby be largely reduced, so that environmental impact is greatly diminished.

To achieve this object, according to the invention two pivotable door leaves covered with sound absorption material are hinged at the front edges of the free arms of the horseshoe-shaped sound absorption wall, with these leaves being capable of pivoting through approximately 60° inward and being of such length that when completely swung inward, they leave a gap for the nose of an aircraft.

This addition to the sound absorption wall, which when swung inward covers the intake region of the engines as well, ensures that practically all residents in the surrounding area are only exposed to a reduced amount of noise during engine testing.

The door leaves can be movable on a plurality of rails, running concentrically around the pivot point and configured as arcs of a circle about the pivot point.

Advantageously, the door leaves have a box-shaped cross section in top view, with a triangular extension at the rear end, the triangular tip of which is mounted, in the area of the ends of the horseshoe-shaped sound absorption walls, as a rotation point, so that in the swung-in position, the sound absorption walls of the door leaves abut the other sound absorption walls without a gap.

To be moved, the door leaves can be driven by motors, associated with each rail and synchronized with one another, which act on the drive rollers guided in the rails through propeller shafts and angle gears.

The configuration and operation of an exemplary embodiments of the invention are explained in more detail with reference to a schematic drawing, the figure of which shows a top view of the overall facility with the aircraft undergoing the engine test.

As the drawing indicates, erected behind the aircraft 1, with for example four engines 2, 3, 4 and 5, is first a latticed directing element in the form of a metal mesh lattice 6, transparent to sound, sloping against the direction of the oncoming flow so that the gas flows emerging from the engines 2-5 are deflected upward, while the sound waves, more or less unhindered, strike the sound absorption wall 7 and are largely absorbed there. Located on each side of the aircraft are additional sound absorption walls 8 and 9 with inwardly angled extensions 12 and 13 at the rear end which form, with the exception of gaps 10 and 11 covered in a noise-suppressing manner, a complete horseshoe-shaped sound absorption wall surrounding the aircraft.

As a result, most of the noise radiated from the engines is suppressed. With a configuration of this type, however, noise radiated from the engine intake area can emerge freely at the front and thus lead to considerable noise impact. The invention therefore provides for additional door leaves 16 and 17 to be pivoted at the front ends 14 and 15 of the lateral sound absorption walls 8 and 9, with the said leaves being covered, at least on the inside, with sound absorption material. In top view, these door leaves 16 and 17 have a rectangular cross section and have at the rear end a triangular extension 18 and 19, the triangular tip of which forms the pivot points 20 and 21 of the door leaves 16 and 17, respectively. The tip angle of these triangular extensions 18 and 19 is dimensioned and the pivot points 20 and 21 are shifted outward from the sound absorption walls 8 and 9 such that the door leaves 16 and 17 can be pivoted inward through about 60°, so that the sound absorption walls 22 and 23 of the door leaves 16 and 17, which then lie in the center, abut the absorption walls 8 and 9 without a gap.

The door leaves 16 and 17 are guided on, for example, three rails 30, 31 and 32 and 33, 34 and 35, with these rails 30-35 extending as arcs of a circle, concentrically around the pivot points 20 and 21.

The rollers 36 and 37 guided in, for example, rail 32, are driven by a motor 38, a propeller shaft 39 and angle drives 40; a separate drive can be associated with each drive rail and the rollers associated with it, and all the drives are synchronized proportionally to the rotation speed required in each case for the rollers in the rails at the different radii.

The door leaves 16 and 17 are sufficiently long that when they are swung in, a gap (a) sufficient for the nose of the aircraft still remains.

The open position of the door leaves 16 and 17 as indicated by the dot-dash outlines 16' and 17', with the pivot travel of the door leaves 16 and 17 limited by corresponding limit switches 42 and 43.

Of course, these door leaves 16 and 17 can also be opened manually, with hook attachments 44 and 45 being provided for hitching up a suitable towing vehicle.

With the arrangement described above, when the door leaves are pivoted inward the noise impact on residents in the surrounding area is reduced at least to a tolerable level. In addition, interfering wind loads, which in some circumstances can even prevent engine testing, can largely be excluded, since the aircraft and the engines are enclosed and shielded on practically all sides.

By erecting the direction elements to deflect the exhaust flows at a short distance behind the aircraft, it is possible to utilize the noise protection wall behind it in an effective manner, without having the exhaust gases strike it.

What is claimed is:

1. Protective means for soundproofing large, high-speed gas flows, especially of aircraft engines, comprising:
   sound permeable, directing elements in a form of a mesh lattice erected behind the engines, said elements being obliquely inclined;
   an approximately horseshoe-shaped sound absorption wall having two legs, a back, inside and outside faces, said legs each having an end, said wall being approximately twice as high as said directing elements, said wall located behind said directing elements, said wall being substantially rectangular in cross-section, having front edges located at the end of each the legs; and,
   a pair of pivotable gates covered with sound absorption material pivotally attached at said front edges of said horseshoe-shaped sound absoption wall, said gates being pivotable approximately 60° inward leaving a gap for a nose of an aircraft when completely pivoted inward wherein the gates are movable on a plurality of rails running concentrically about said front edges configured as arcs of a circle about said front edges.

2. Protective means as recited in claim 1 wherein said gates are substantially rectangular in cross section, each having two ends, one end of each of said gates having a triangular extension, said triangular extension culminating in outermost tips, said tips mounted at the outside face of said front edges of said wall, said mounting essentially being an axis of rotation wherein when pivotted fully inwards said sound absorption material of said gates abut said front edges of said horseshoe-shaped sound absorption wall without a gap.

3. Protective means as recited in claim 1, wherein the gates are driven by motors associated with each of said rails, said motors being synchronized and acting on drive rollers guided in said rails by propeller shafts and angle gears.

* * * * *